July 15, 1947.        E. J. GOSH        2,423,933
FISHING ROD HOLDER
Filed Feb. 25, 1946
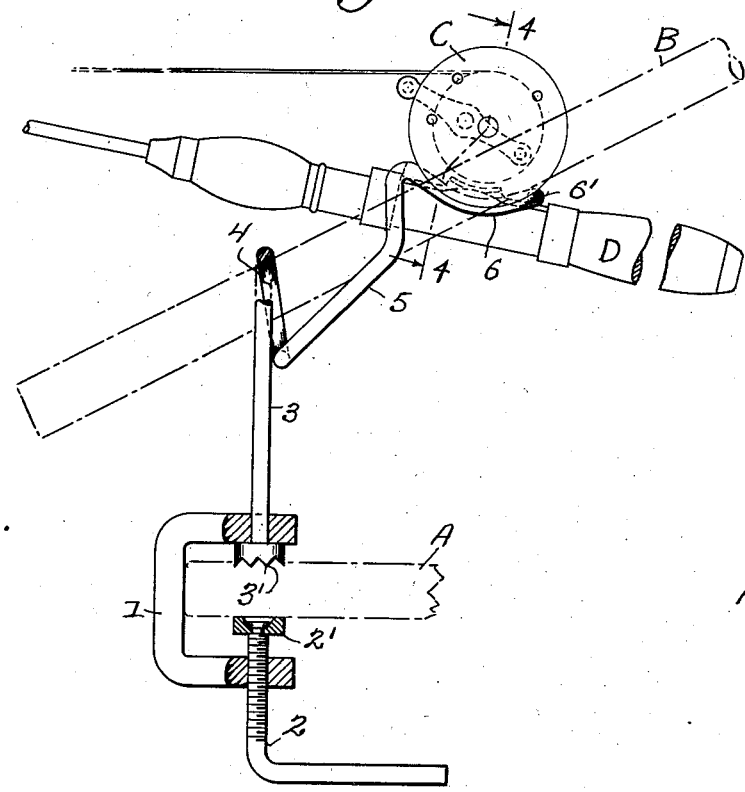
Fig. 1.
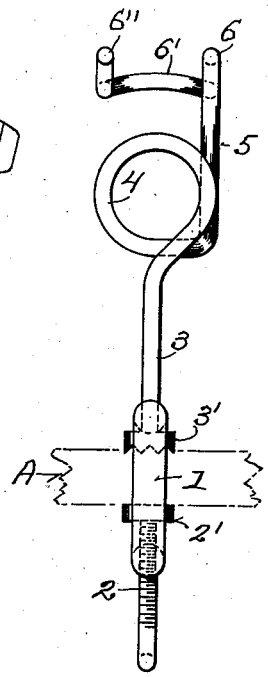
Fig. 2.
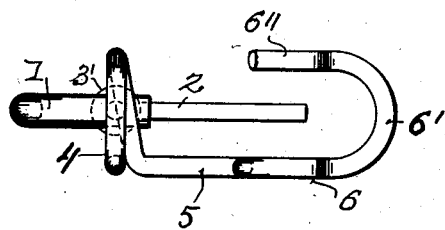
Fig. 3.
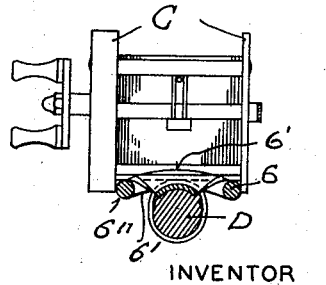
Fig. 4.
INVENTOR
EDMOND J. GOSH
BY 
ATTORNEYS Patented July 15, 1947

2,423,933

UNITED STATES PATENT OFFICE 2,423,933

FISHING ROD HOLDER

Edmond J. Gosh, Milwaukee, Wis.

Application February 25, 1946, Serial No. 649,994

2 Claims. (Cl. 248—40)

My invention refers to fishing rod holders and it has for its primary object to provide a bracket having a pair of loops which are combined to support an ordinary fish pole. One of the loops is in the form of a yoke having a curved open throat for seating a casting reel pole.

The specific object of my invention is to provide a stem having a loop at its end with an arm extending from said loop, terminating with a yoke or loop, the same being swiveled and locked within a clip, which clip serves as an anchorage for the device, it being understood that such anchorage may constitute a seat of a boat, or any board associated with a wharf or shore fishing point.

Briefly, the invention embodies a vertical loop in combination with a horizontal loop of the open or yoke type and a supporting stem.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Fig. 1 represents a side elevation of a fishing rod holder embodying the features of my invention, with parts broken away and in section to more clearly illustrate structural features.

Fig. 2 is an end view of the same.

Fig. 3 is a top plan view of the holder; and

Fig. 4 is a cross sectional view of said holder, particularly illustrating the seat for a rod and reel equipment, the section being indicated by line 4—4 of Fig. 1.

Referring by characters to the drawings, 1 indicates a U shaped clip lapped over a board seat indicated in dotted lines at A. The clip carries a screw threaded lever 2 engaging the lower finger of the clip and terminating with a button 2' in contact with the lower face of the seat board.

The upper finger of the clip is apertured for the reception of a stem 3, which stem extends through the finger and has secured to its lower end a toothed gripping lug 3', which lug is in engagement with the upper face of the anchor board A.

The upper end of the stem is coiled to form a loop 4 and the end of said loop is extended at an angle to form an arm 5. The upper end of the arm has an outwardly extended leg 6, which leg is curved to form a throat 6' and the throat terminates with a leg 6" extending in the direction of the loop, it being understood that this second loop, in effect, constitutes a yoke member.

As indicated in dotted lines in Fig. 1, B is an ordinary fish pole and the butt of the same is extended through the loop 4, and thereafter the rod is socketed in the yoke loop and its weight is supported by engagement with the throat 6' of said yoke.

Should it be desired to change the angle of the tip of said pole, this is accomplished by loosening the lever 2, whereby the stem 3 may be rotated to the desired position, and thereafter said stem is firmly locked by again tightening the gripping lever 2 upon the board.

In the event a fisherman is using a casting rod and reel, as indicated in full lines of Fig. 1, the reel C is seated upon the upper curved faces of the yoke legs 6 and the handle D of the rod is threaded, under the throat 6' of the yoke, whereby the weight of the rod will cause the coupling connection to effect a solid grip upon the outfit.

It is apparent that the vertical angle of the rod and reel may be varied somewhat by slightly bending the arms 5 in either direction. However, as previously described in connection with an ordinary rod, the casting outfit may be swiveled about the stem 3 in any desired position, with reference to the fisherman.

In practice, the fishing rod holder is preferably anchored or secured to the seat of a boat, in advance of the position of the oarsman, whereby it may readily be manipulated. However, it is understood that the holder may be attached to any board upon a wharf or shore line for the convenience of a fisherman.

While this holder is primarily intended as a temporary means of resting the rod, it is apparent when the fisherman desires to troll, he can conveniently anchor his trolling outfit into the holder, as shown in Fig. 1 of the drawings.

I claim:

1. A fishing rod holder comprising a clip, a threaded clamping lever carried by one finger of the clip, a stem swiveled in the other finger of said clip terminating with a tooth gripping lug, associated with the clamping lever, for engagement with a board, a loop formed at the upper end of the stem, an arm extending outwardly from the loop, a second loop formed at the end of the arm, the same being of the yoke type having curved legs, and a throat adapted to receive a reel and handle of a fishing rod.

2. A fishing rod holder comprising a stem, a vertically positioned loop formed at the upper end of said stem, an arm extending outwardly from the loop, a second loop formed at the end of the arm, the same being of the yoke type having horizontally disposed legs and a throat adapted to receive a reel and handle of a fishing rod.

EDMOND J. GOSH.

REFERENCES CITED

The following references are of record in the file of this patent:

UNITED STATES PATENTS

| Number | Name | Date |
|---|---|---|
| 2,137,645 | Doench | Nov. 22, 1938 |
| 2,341,065 | White | Feb. 8, 1944 |